(12) United States Patent
Stricklin et al.

(10) Patent No.: US 10,750,714 B2
(45) Date of Patent: Aug. 25, 2020

(54) ELECTRONIC PET DOOR

(71) Applicant: Radio Systems Corporation, Knoxville, TN (US)

(72) Inventors: Cody Lee Stricklin, Knoxville, TN (US); Marc Edward Brush, Knoxville, TN (US); Jason Richard Graves, Knoxville, TN (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 183 days.

(21) Appl. No.: 16/104,639

(22) Filed: Aug. 17, 2018

(65) Prior Publication Data

US 2019/0069508 A1 Mar. 7, 2019

Related U.S. Application Data

(60) Provisional application No. 62/547,370, filed on Aug. 18, 2017.

(51) Int. Cl.
*A01K 1/00* (2006.01)
*E05B 47/00* (2006.01)

(52) U.S. Cl.
CPC ........ *A01K 1/0017* (2013.01); *E05B 47/0012* (2013.01); *E05B 2047/0094* (2013.01)

(58) Field of Classification Search
CPC ....... A01K 1/00; A01K 1/0017; A01K 1/0029
USPC .......................... 119/416, 484, 501, 506, 524
See application file for complete search history.

(56) References Cited

U.S. PATENT DOCUMENTS

| | | | |
|---|---|---|---|
| 318,812 A | 5/1885 | Smith et al. | |
| 539,394 A | 5/1895 | Poulson | |
| 1,189,790 A | 7/1916 | Carroll et al. | |
| 1,211,762 A | 1/1917 | Sawyer et al. | |
| 2,247,598 A | 7/1941 | Bohlen et al. | |
| 2,560,661 A | 7/1951 | Poovey | |

(Continued)

FOREIGN PATENT DOCUMENTS

| | | |
|---|---|---|
| CN | 205577779 U | 9/2016 |
| GB | 2236135 B | 8/1993 |
| GB | 2406874 A | 4/2005 |

OTHER PUBLICATIONS

Chainlink Box Dog Kennel available from PetSafe, accessed on Sep. 11, 2013 from www.petfenceusa.com, 1 page.

(Continued)

*Primary Examiner* — Richard T Price, Jr.
(74) *Attorney, Agent, or Firm* — Baker, Donelson, Bearman, Caldwell & Berkowitz PC

(57) ABSTRACT

An electronic pet door is provided herein. The electronic pet door includes a pivotal flap and a frame that defines a through-way. A rotatable knob is mounted to the frame and has a handle portion and a stop wall. The handle portion and stop wall include various profiles and configurations that work in concert to control the flap's direction of pivotal movement. In a first configuration, the flap may swing outwardly or inwardly. A second configuration prevents the flap from swinging inwardly. A third configuration prevents the flap from swinging outwardly. A fourth configuration places the flap is in a locked position to prevent swinging in either direction. The electronic door also includes an electronic latch mechanism which selectively latches and unlatches the flap. The latch mechanism unlatches the flap in response to a wireless signal from an electronic transmitter that may be affixed to a pet.

27 Claims, 9 Drawing Sheets

(56) References Cited

U.S. PATENT DOCUMENTS

| | | |
|---|---|---|
| 2,758,646 A | 8/1956 | Johnson et al. |
| 2,789,531 A | 4/1957 | Diefendorf |
| 2,892,562 A | 6/1959 | Smithson |
| 3,675,402 A | 7/1972 | Weed |
| 3,738,322 A | 6/1973 | Smith |
| 3,774,929 A | 11/1973 | Stanley |
| 3,978,616 A | 9/1976 | Pennock |
| 4,022,263 A | 5/1977 | Beckett et al. |
| 4,170,312 A | 10/1979 | Lloyd et al. |
| 4,216,743 A | 8/1980 | Cohen |
| 4,224,899 A | 9/1980 | Cruchelow et al. |
| 4,256,056 A | 3/1981 | Sou |
| 4,322,913 A | 4/1982 | Himmer et al. |
| 4,408,416 A | 10/1983 | Davlantes et al. |
| 4,421,058 A | 12/1983 | Paul |
| D287,650 S | 1/1987 | Braeuner |
| 4,651,793 A | 3/1987 | Davlantes et al. |
| 4,696,259 A | 9/1987 | Fewox |
| 4,754,797 A | 7/1988 | Sronce et al. |
| 4,762,085 A | 8/1988 | Ondrasik |
| 4,776,133 A | 10/1988 | Green et al. |
| 4,969,292 A | 11/1990 | Reid et al. |
| 4,989,546 A | 2/1991 | Cannaday |
| 4,991,350 A | 2/1991 | Kirk |
| 5,005,526 A | 4/1991 | Parker |
| 5,123,377 A | 6/1992 | Edwards |
| 5,167,202 A | 12/1992 | Bradford et al. |
| 5,203,281 A | 4/1993 | Harwich |
| 5,282,542 A | 2/1994 | Mo |
| 5,287,654 A | 2/1994 | Davlantes et al. |
| 5,364,458 A | 11/1994 | Burnett et al. |
| 5,464,113 A | 11/1995 | Ho et al. |
| 5,469,659 A | 11/1995 | Reid et al. |
| 5,469,807 A | 11/1995 | Kosmaczeska |
| 5,479,892 A | 1/1996 | Edwards |
| 5,535,804 A | 7/1996 | Guest et al. |
| 5,581,940 A | 12/1996 | Peterson et al. |
| 5,626,098 A | 5/1997 | Askins et al. |
| 5,649,500 A | 7/1997 | Klavemann et al. |
| D382,374 S | 8/1997 | Burks |
| 5,657,592 A | 8/1997 | Davlantes et al. |
| 5,701,702 A | 12/1997 | Reid et al. |
| 5,701,813 A | 12/1997 | Smith et al. |
| 5,735,079 A | 4/1998 | Davlantes et al. |
| 5,785,003 A | 7/1998 | Jacobson et al. |
| 5,845,970 A | 12/1998 | Schwartz |
| 5,890,455 A | 4/1999 | Donchey |
| 5,931,326 A | 8/1999 | Weng |
| 5,938,057 A | 8/1999 | Cramer et al. |
| 5,946,855 A | 9/1999 | Miconi et al. |
| 5,946,856 A | 9/1999 | Davlantes et al. |
| 5,960,744 A | 10/1999 | Rutman |
| 5,967,090 A | 10/1999 | Hui |
| 5,992,096 A | 11/1999 | De et al. |
| D427,730 S | 7/2000 | Powers et al. |
| 6,141,911 A | 11/2000 | Reid |
| D442,748 S | 5/2001 | Farrugia |
| 6,272,793 B1 | 8/2001 | Davlantes et al. |
| 6,297,739 B1 | 10/2001 | Small |
| 6,354,245 B1 | 3/2002 | Roddy et al. |
| 6,385,909 B1 | 5/2002 | Marsh et al. |
| 6,464,745 B2 | 10/2002 | Rivera et al. |
| 6,601,723 B1 | 8/2003 | Ziglar |
| 6,691,483 B2 | 2/2004 | Lethers et al. |
| 6,694,918 B2 | 2/2004 | Draft |
| 6,959,511 B2 | 11/2005 | Johnson et al. |
| 6,966,147 B2 | 11/2005 | Solowiej |
| 7,063,123 B2 | 6/2006 | Lethers et al. |
| 7,150,244 B2 | 12/2006 | Dawes et al. |
| 7,152,371 B2 | 12/2006 | Vaccari et al. |
| 7,159,361 B1 | 1/2007 | Hale, Jr. et al. |
| 7,197,848 B2 | 4/2007 | Vaccari et al. |
| 7,207,141 B2 | 4/2007 | Sullivan et al. |
| 7,284,502 B1 | 10/2007 | Dotter et al. |
| 7,363,956 B2 | 4/2008 | Lethers et al. |
| 7,765,955 B2 | 8/2010 | Brooks et al. |
| 7,798,103 B2 | 9/2010 | Bosserdet, Jr. et al. |
| 7,866,769 B2 | 1/2011 | Ahlgrim et al. |
| 7,886,486 B2 | 2/2011 | Lomax et al. |
| 7,928,302 B2 | 4/2011 | Sandson |
| 8,430,795 B2 | 4/2013 | Publicover et al. |
| 8,434,264 B2 | 5/2013 | Bosserdet, Jr. et al. |
| 8,464,663 B2 | 6/2013 | Kodat |
| 8,595,976 B1 | 12/2013 | Solowiej et al. |
| 8,783,801 B2 | 7/2014 | Kaplan et al. |
| 8,839,556 B2 | 9/2014 | Brooks et al. |
| 8,854,215 B1 | 10/2014 | Ellis et al. |
| 8,917,172 B2 | 12/2014 | Charych |
| 9,145,731 B1 | 9/2015 | McCoy et al. |
| 9,157,269 B2 | 10/2015 | Brown |
| 9,284,773 B1 | 3/2016 | Fridley et al. |
| 10,223,850 B2 | 3/2019 | Sample |
| 2005/0252622 A1 | 11/2005 | Reid |
| 2005/0274463 A1 | 12/2005 | Becker |
| 2006/0011144 A1 | 1/2006 | Kates |
| 2006/0011146 A1 | 1/2006 | Kates |
| 2006/0252366 A1 | 11/2006 | Eu |
| 2007/0175097 A1 | 8/2007 | Thorne et al. |
| 2007/0204514 A1 | 9/2007 | Grimmett et al. |
| 2007/0204803 A1 | 9/2007 | Ramsay |
| 2007/0234643 A1 | 10/2007 | Siegal et al. |
| 2010/0126071 A1 | 5/2010 | Hill et al. |
| 2010/0242854 A1 | 9/2010 | Seger et al. |
| 2010/0269413 A1 | 10/2010 | Sullivan et al. |
| 2011/0192356 A1 | 8/2011 | Loosveld et al. |
| 2013/0305609 A1 | 11/2013 | Graves |

OTHER PUBLICATIONS

Cottageview Dog Kennel available from PetSafe, from www.wag.com, accessed on Sep. 11, 2013, 1 page.
Extended European Search Report for Application No. EP17208380 dated May 17, 2018, 8 pages.
Ideal Pet Aluminum Modular Pet Patio Door [retrieved on Dec. 22, 2015] Retrieved from the Internet: (URL: http://www.idealpetproducts.com).
In the Company of Dogs, Spring Preview 2001—Catalog, Portland, Tennessee, 2001, 49 pages.
International Search Report and Written Opinion for Application No. PCT/US2018/46942, dated Nov. 1, 2018, 11 pages.
Lucky Dog Chain Link Boxed kennel available from Walmart, from www.walmart.com, accessed on Sep. 11, 2013, 1 page.
Lucky Dog Welded Wire Kennel available from Walmart, from www.walmart.com, accessed on Sep. 11, 2013, 1 page.
Options Plus Welded Wire Kennel available from HayNeedle, from www.hayneedle.com, accessed on Sep. 11, 2013, 1 page.
PetSafe Freedom Patio Panel [retrieved on Dec. 16, 2015] Retrieved from the Internet: (URL: http://www.petsafe.net).
PetSafe Sliding Glass Pet Door [retrieved on Dec. 22, 2015] Retrieved from the Internet:(URL: http://www.petsafe.net).
Precision Pet Kennel available from PetCo., from www.petco.com, accessed on Sep. 11, 2013, 1 page.

ELECTRONIC PET DOOR

CROSS REFERENCE TO RELATED APPLICATIONS

Applicant claims the benefit of U.S. Provisional Patent Application Ser. No. 62/547,370 filed Aug. 18, 2017 and entitled Electronic Pet Door.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

This invention pertains to an electronic pet door for granting an animal access to a through-way defined by the pet door. More particularly, this invention pertains to an electronic pet door for automatically granting a selected animal access to the through-way and automatically denying a non-selected animal access to the through-way while also allowing only certain passage direction through the pet door.

TECHNOLOGY IN THE FIELD OF THE INVENTION

When creating a selective entry pet door, one of the major key components to its functionality is the locking mechanism. One of the difficulties with creating an effective locking mechanism is needing the mechanism to re-latch the door flap regardless of its motion/location during the re-latching event. Some doors require timed locking mechanisms that ensure the door flap is in the correct position before re-latching.

Latching mechanisms for pet doors have existed for many years. Patent publication numbers U.S. Pat. No. 9,217,279B2, U.S. Pat. No. 9,284,773B1, US20130247834A1, and U.S. Pat. No. 7,583,931B2 outline a method of locking/unlocking by using a solenoid actuated plunger. Patent publication number U.S. Pat. No. 5,967,215A outlines a method of locking/unlocking by using a manually actuated mechanical slide. Patent publication number U.S. Pat. No. 7,765,955B2 outlines a method of locking/unlocking by using a slider crank and worm gear mechanism to drive the latch vertically. Patent publication number U.S. Pat. No. 5,469,659A utilizes a magnetic see-saw that actuates the latch when a pet with a magnetic collar enters the area where the magnetic see-saw is located. Patent publication number EP2983141A1 utilizes a spiral shaped camming device, directly mounted to an electric motor's drive shaft, to move the latch vertically.

The invention disclosed here utilizes an over center 3 bar linkage system to ensure the lock remains locked/unlocked, regardless of outside forces acting on the latch. The linkage system also features a slot to allow the 3rd linkage to slide freely without affecting the product's lock/unlock setting.

Accordingly, a need exists for an improved electronic pet door which latches the door to prevent unwanted entry.

BRIEF SUMMARY OF THE INVENTION

A pet door comprises a frame, a flap pivotally coupled to the frame, the flap having a top portion and a bottom portion opposite the top portion, a knob rotatably coupled to the frame. The knob has a first portion with a select height to allow the pivotal movement of the flap bottom portion past the knob, a second portion with a select height to abut the flap bottom portion to prevent the pivotal movement of the flap bottom portion past the knob, a third portion with a select height to allow the pivotal movement of the flap bottom portion past the knob, and a fourth portion with a select height to abut the flap bottom portion to prevent the pivotal movement of the flap bottom portion past the knob. The knob also having a stop wall having a stop wall first portion aligned with the knob first portion and a select height to allow the pivotal movement of the flap bottom portion past the stop wall, a stop wall second portion aligned with the knob second portion and a select height to allow the pivotal movement of the flap bottom portion past the stop wall, a stop wall third portion aligned with the knob third portion and a select height to prevent the pivotal movement of the flap bottom portion past the stop wall, and a fourth portion aligned with the knob fourth portion and a select height to prevent the pivotal movement of the flap bottom portion past the stop wall.

An electronic pet door comprises a frame, a flap pivotally coupled to the frame having a top portion and a bottom portion opposite the top portion, and an automatic latching device which includes an over center three bar linkage coupled to an electric motor. The three bar linkage includes a first link in the form of a pivot arm coupled to the electric motor, a second link pivotally coupled to the first link opposite the electric motor, and a third link pivotally coupled to the second link opposite the first link, the third link having a stop extending through the frame between a first position engaging the bottom portion of the flap and a second position disengaged from the bottom portion of the flap, and comprising a spring biasing the third link towards the first position.

BRIEF DESCRIPTION OF THE DRAWINGS

So that the manner in which the present inventions can be better understood, certain illustrations are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below.

Description of Selected Specific Embodiments

Figure 1:
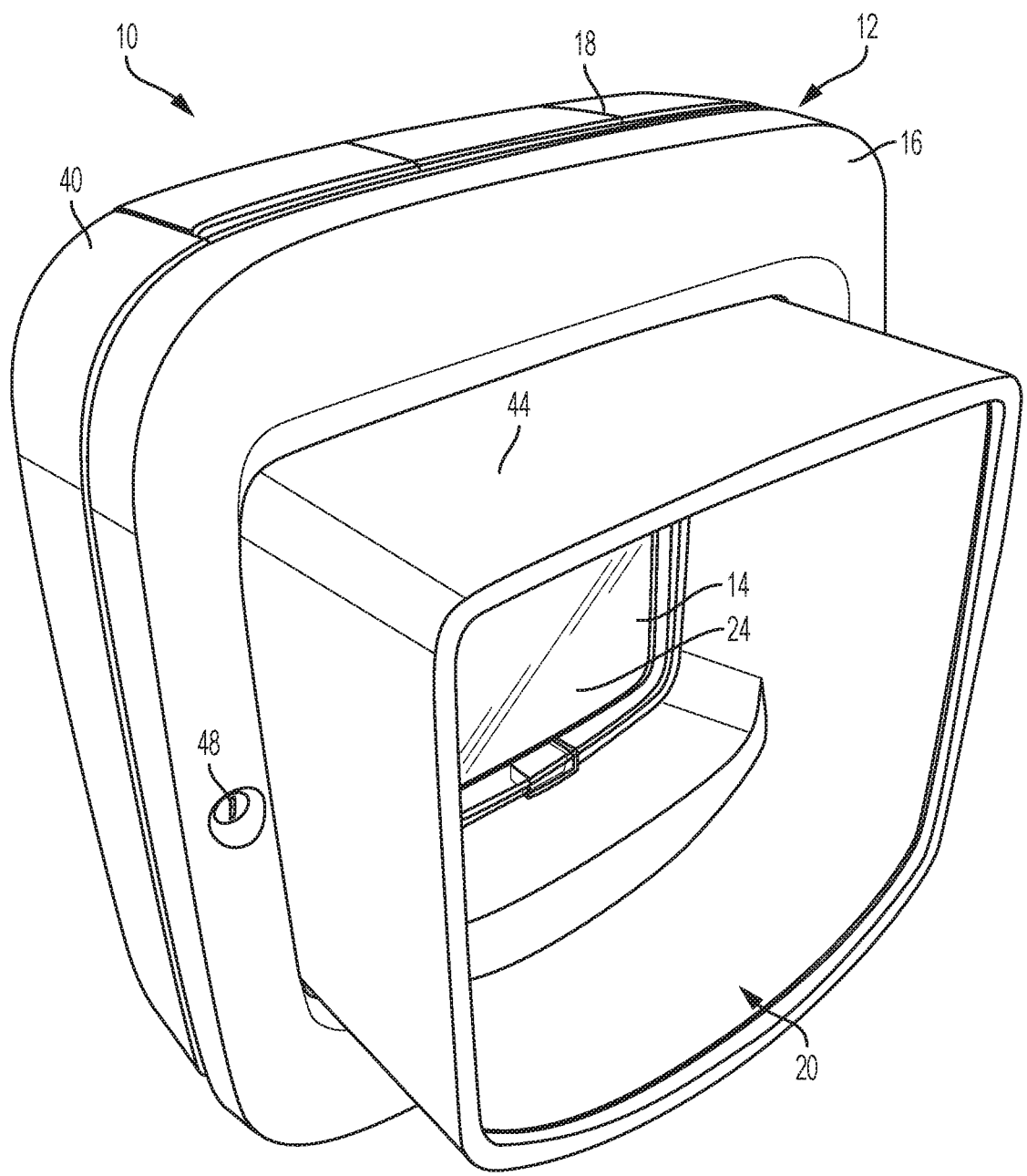
FIG. 1 is a perspective view of the rear side of an electronic pet door of the present invention, in one embodiment.

FIG. 1 provides a perspective view of one embodiment of an electronic pet door 10 constructed in accordance with the various features of the present invention. The electronic pet door 10 includes a frame 12 and a flap 14, shown in the drawings as being transparent. The frame 12 includes an exterior, first frame member 16 and an interior, second frame member 18. The terms interior and exterior as used herein are intended to be with respect to the interior and exterior of a house or dwelling to which the pet door 10 is mounted. The first frame member 16 is mechanically secured to the second frame member 18 such that the frame 12 defines a through-way 20. In operation, the electronic pet door 10 automatically grants a selected animal access through a through-way 20 defined by the electronic pet door 10 and denies a non-selected animal access through the through-way 20.

The flap 14 is constructed of a substantially rigid material, such as, but not limited to, a plastic, and includes an interior or inside facing surface (best seen at 22 in FIG. 3) and an exterior surface 24 opposite the interior surface 22. The flap 14 is disposed within the through-way 20 such that the contour of the flap 14 is substantially aligned with the corresponding contour of the through-way 20. The flap 14 pivots bi-directionally at the hinge or pivot in response to a lateral force applied at the flap 14, which may include the lateral force of an animal laterally pushing against the flap 14.

Figure 2:
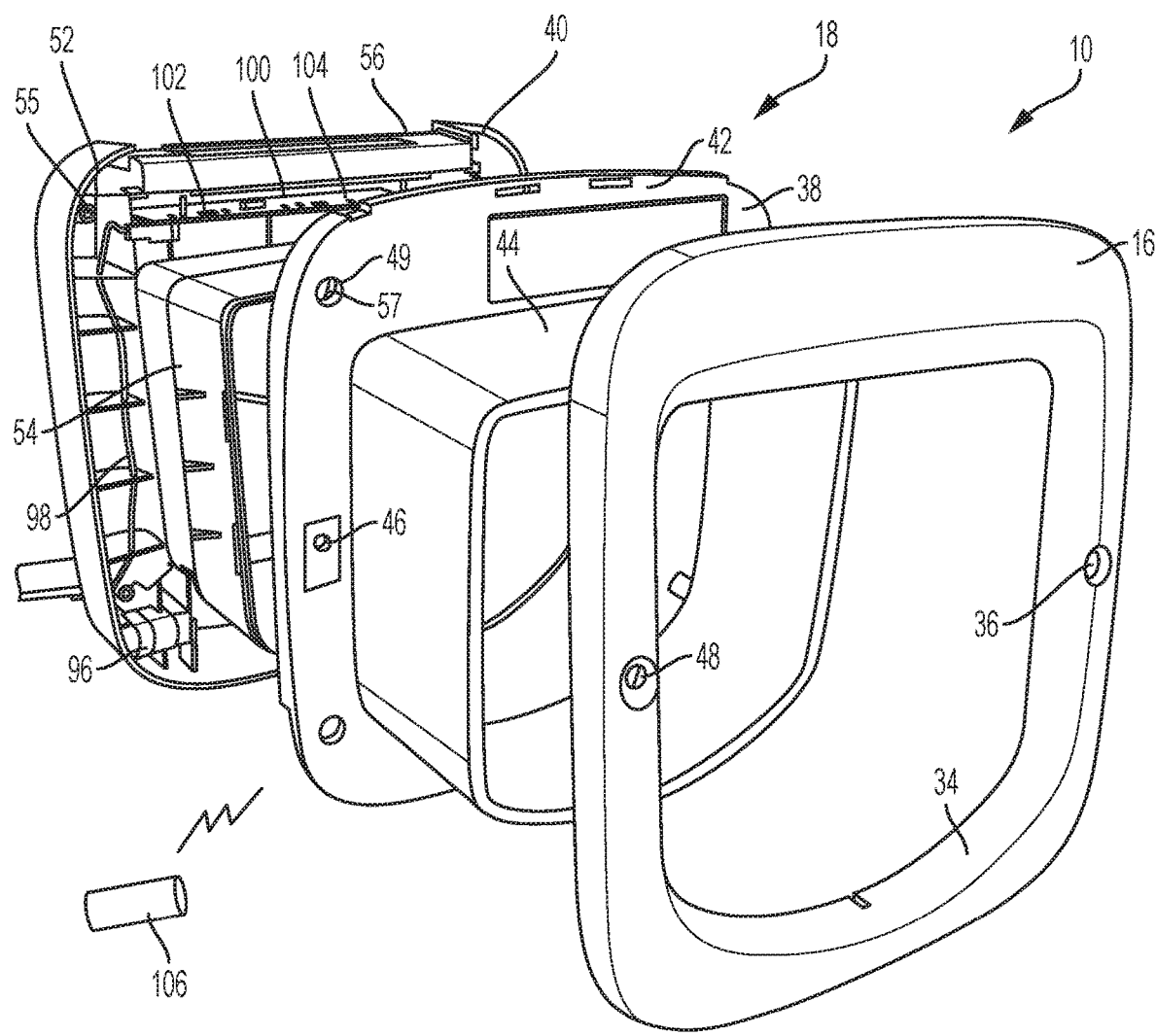
FIG. 2 is an exploded, perspective view of the electronic pet door of FIG. 1.

FIG. 2 provides an exploded, perspective view of the electronic pet door 10. As shown in FIG. 2, the first frame member 16 has an opening 34 therein which partially defines the through-way (seen at 20 in FIG. 1). The first frame member 16 also has two oppositely disposed screw mounting holes 36 there through.

Also visible in FIG. 2, the second frame member 18 includes a mounting plate 38 and a cover plate 40. The mounting plate 38 is configured to nest within the peripheral margin of the cover plate 40. The mounting plate 38 includes a peripheral mounting flange 42 and an elongated, tubular channel 44 which partially defines through-way (best seen at 20 in FIG. 1). The mounting plate 38 also has a pair of oppositely disposed screw mounting holes 46 which align with the screw mounting holes 36 of the first frame member 16 and are configured to threadably receive threaded mounting screws 48 passing there through. The mounting plate 38 also has four screw mounting holes 49 that are disposed adjacent the rounded corners of the mounting plate 38.

The cover plate 40 includes a peripheral margin or flange 52 and an elongated, tubular channel 54 configured to telescopically fit within the tubular channel 44 of mounting plate 38. The tubular channel 54 of the cover plate 40 has two oppositely disposed flap pivot holes 50 which receive the flap pivot pins 28 therein for pivotal movement of the flap 14. The peripheral flange 52 has four screw mounting holes 55 aligned with mounting plate screw mounting holes 49 and adapted to receive threaded screws 57. The top surface of the peripheral flange 52 has a battery compartment 56 (discussed in more detail with regard to FIG. 3.).

Figure 3:
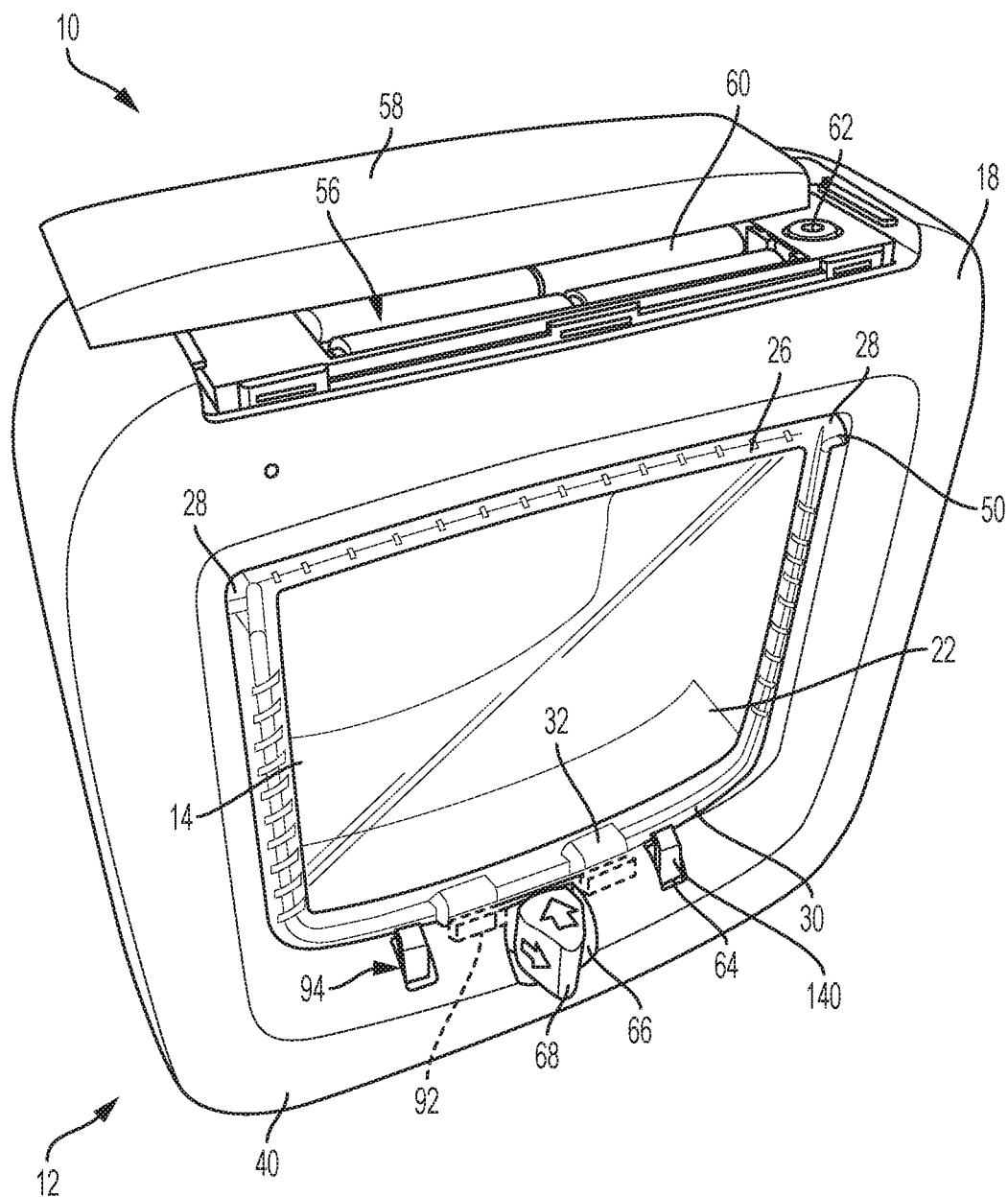
FIG. 3 is a perspective view of the front side of the electronic pet door of FIG. 1.
Figure 8:
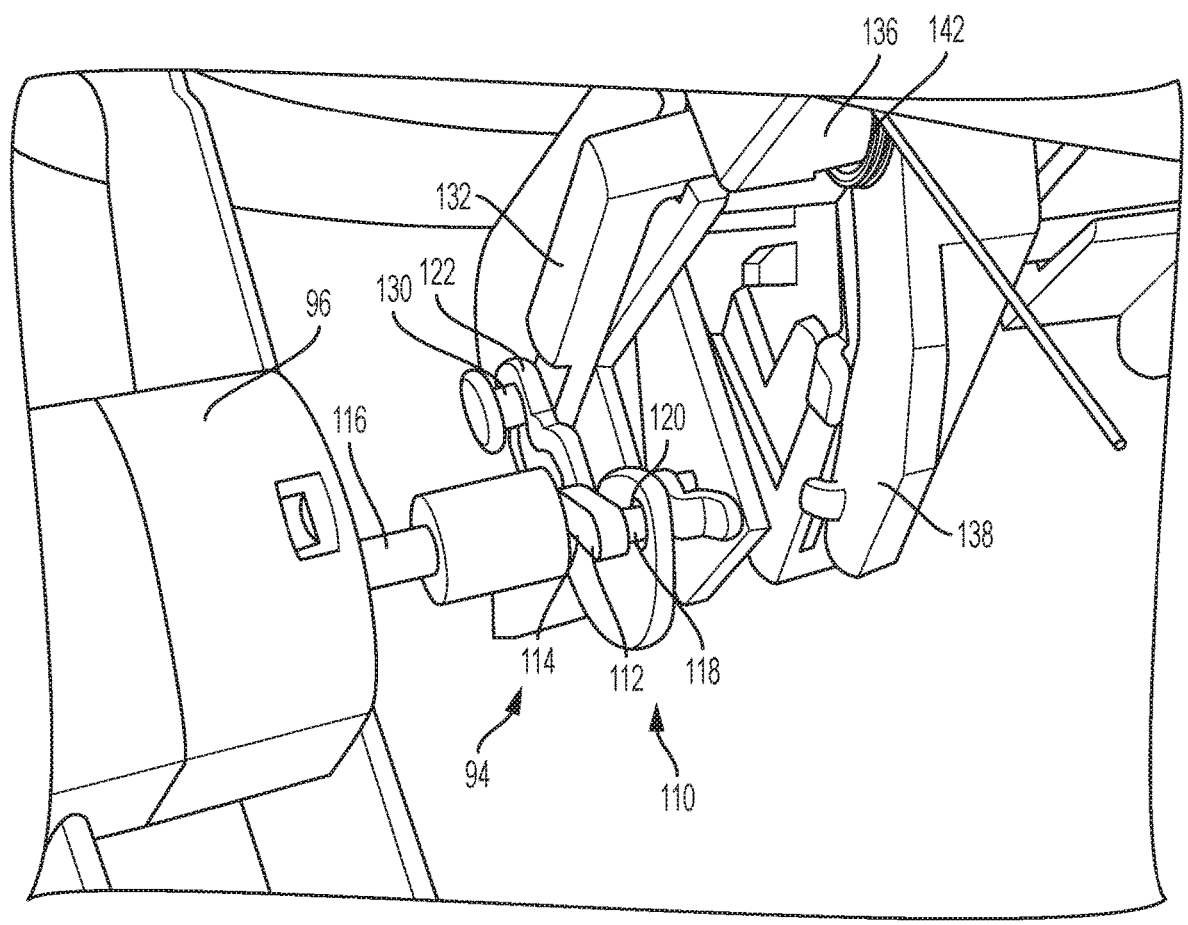
FIG. 8 is a perspective view of a linkage portion of the latch mechanism of the electronic pet door of FIG. 1, shown in a first, unlocked position.
Figure 9:
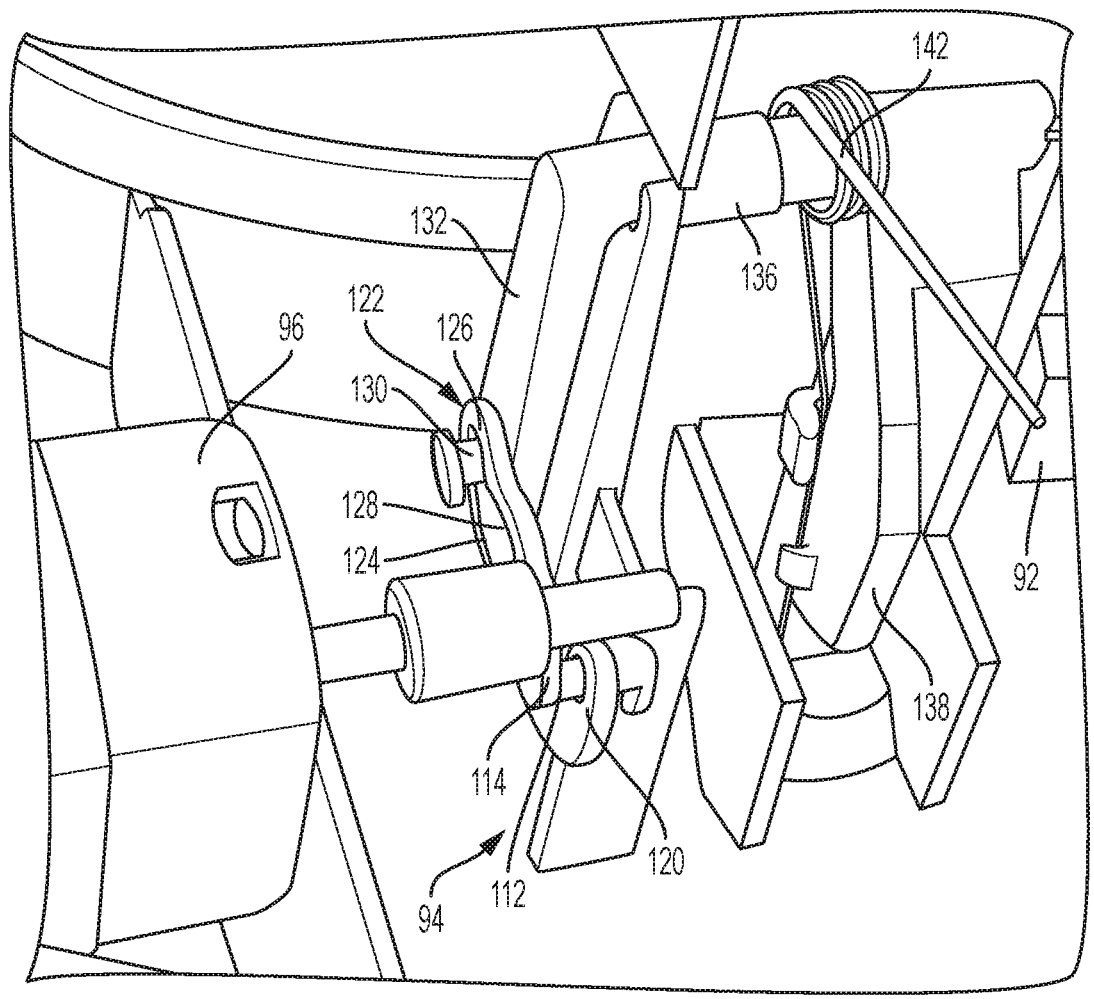
FIG. 9 is a perspective view of a linkage portion of the latch mechanism of the electronic pet door of FIG. 1, shown in a second, locked position.

The electronic pet door 10 also includes an automatic electronic latch mechanism seen best in FIGS. 3, 8, and 9 at 94) which selectively latches and unlatches the flap 14. FIG. 2 shows a circuit board 100 including a microprocessor 102, and an electric motor 96, which work in concert to control the opening and closing of the latch mechanism 94. The electric motor 96 is electrically coupled to the circuit board 100 and powered by a set of batteries (shown at 60 in FIG. 3) through one or more electrical wires or connectors 98. The circuit board 100 includes a wireless signal receiver 104 which receives wireless signals from a wireless electronic transmitter 106 coupled to a pet's collar, or an internally implanted transmitter surgically inserted into a pet.

FIG. 3 provides a perspective view of the front of the electronic pet door 10. As shown, the battery compartment 56 is overlaid by a pivotal or removable battery door 58. The battery compartment 56 houses batteries 60 which are the power source for the electronic door 10. An on/off/programming switch 62 is also housed beneath the battery door 58 and electrically coupled to the batteries 60 and the circuit board (100 of FIG. 2) to energize the circuit board and the actuation of the electronic latch mechanism 94, as described hereinafter.

As shown in FIG. 3, the flap 14 has a top portion 26 which includes two oppositely disposed pivot pins or posts 28 and a bottom edge, margin or portion 30 opposite the top portion 26. Two magnets 32 are coupled to the flap 14 closely adjacent the bottom portion 30. FIG. 3 also shows a pair of stop openings 64 and a centrally located knob opening 66 on the cover plate 40. A rotatable knob 68 is positioned within the knob opening 66 for 360 degree rotation therein.

The cover plate 40 has a pair of magnets 92 positioned on opposite sides of the knob 68 and aligned to magnetically attract or engage the pair of flap magnets 32. The magnetic attraction between the magnets 92 and 32 aid the gravitational movement and maintenance of the flap 14 to a closed position by drawing the flap to the correct position relative to the cover plate 40. The magnets 92 and 32 also aid in preventing the unwanted movement or pivoting of the flap 14 by subtle outside forces, such as wind.

FIGS. 4 through 7 provide perspective front views of the rotatable knob 68 in various positions along the 360 degree axis. These figures demonstrate that rotation of the knob controls the swinging direction of the flap (14 at FIG. 3).

Figure 4:
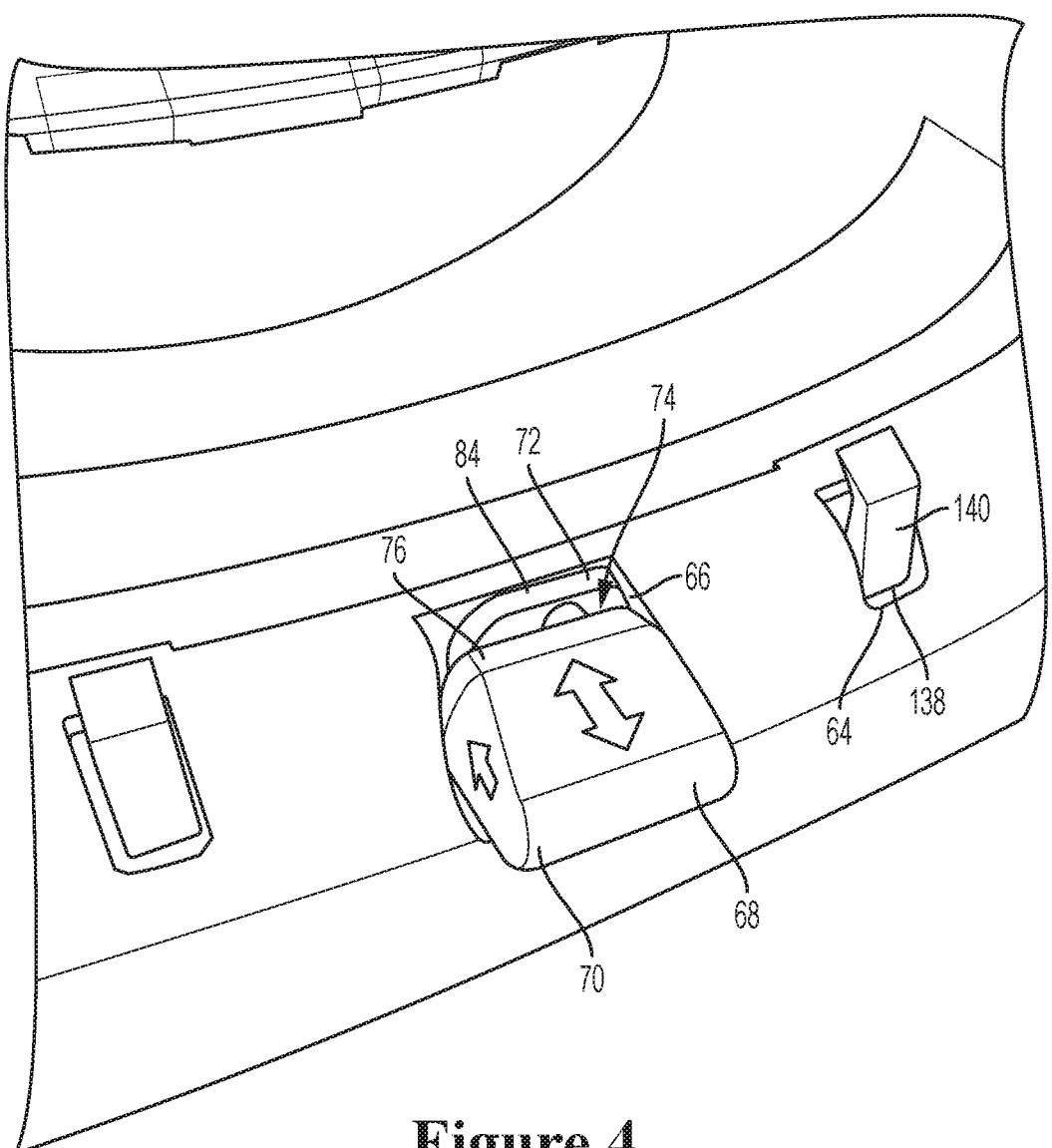
FIG. 4 is a perspective view of a portion of the latch mechanism showing the knob or manual lock of the electronic pet door of FIG. 1 in a first position.

As shown in FIG. 4, the rotatable knob 68 has a handle portion 70 and a stop plate, stop wall portion or stop wall 72 separated from each other by a space or groove 74. The bottom portion 30 of flap 14 is positionable within the space or groove 74 when the flap is in a closed position (seen more clearly in FIG. 3). The handle portion 70 is generally rectangular in shape with, and in the first position, a radially extending first portion 76 of the handle 70 is shown. As shown, the first portion 76 has a radially low profile which allows the inward swinging or passage of the flap (14 at FIG. 3). The rotatable knob 68 or handle portion 70 is considered to be an interior portion as it is positioned within the interior of the home having the pet door 10, while the stop wall 72 is considered to be an exterior portion as it is positioned at the exterior of the home having the pet door 10.

Figure 5:
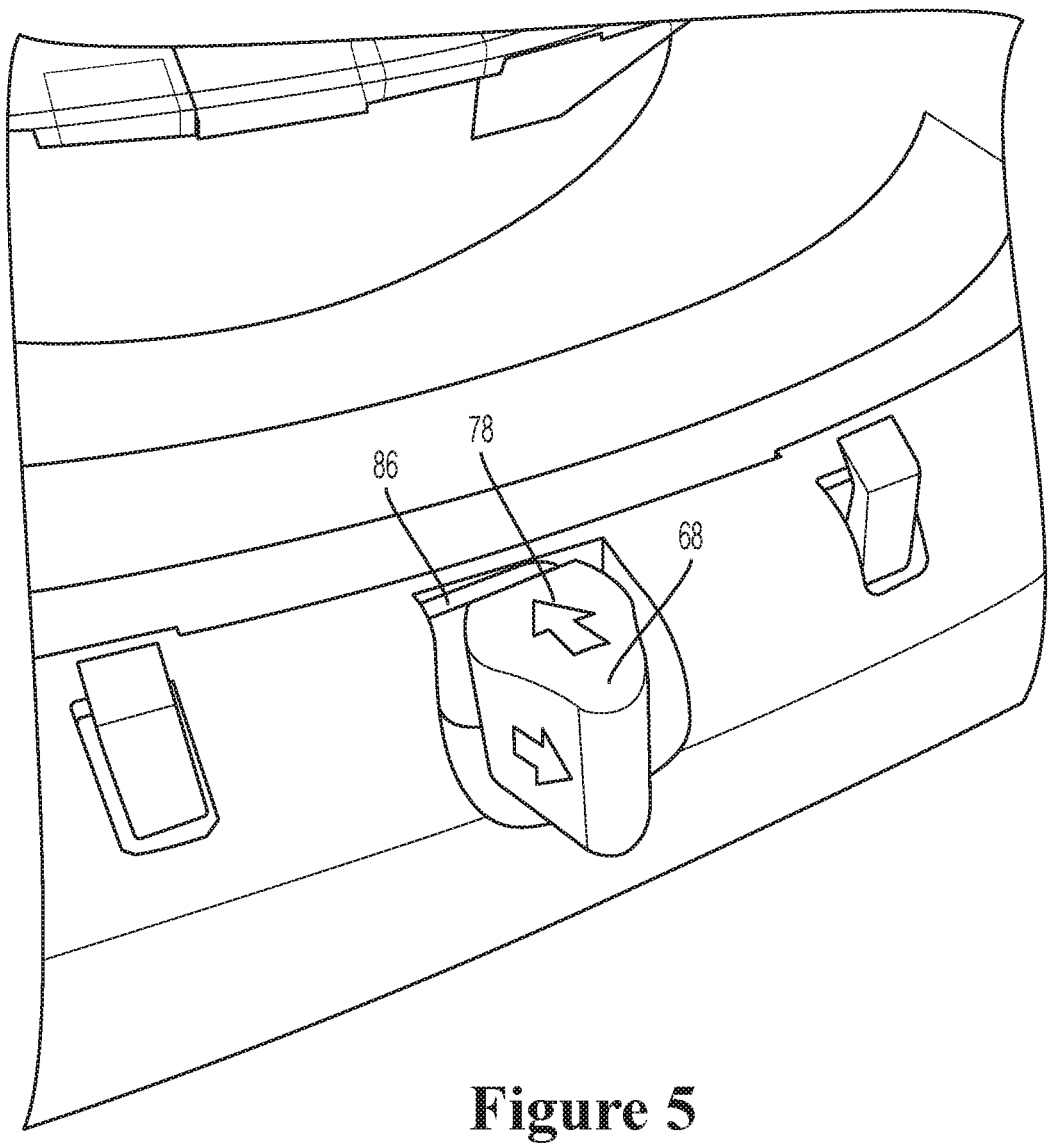
FIG. 5 is a perspective view of a portion of the latch mechanism showing the knob or manual lock of the electronic pet door of FIG. 1 in a second position.

FIG. 5 shows the knob 68 in a second position. When so oriented, a radially extending second portion 78 of the knob 68, which has a radially high profile, prevents the inward swinging or passage of the flap (14 at FIG. 3).

Figure 6:
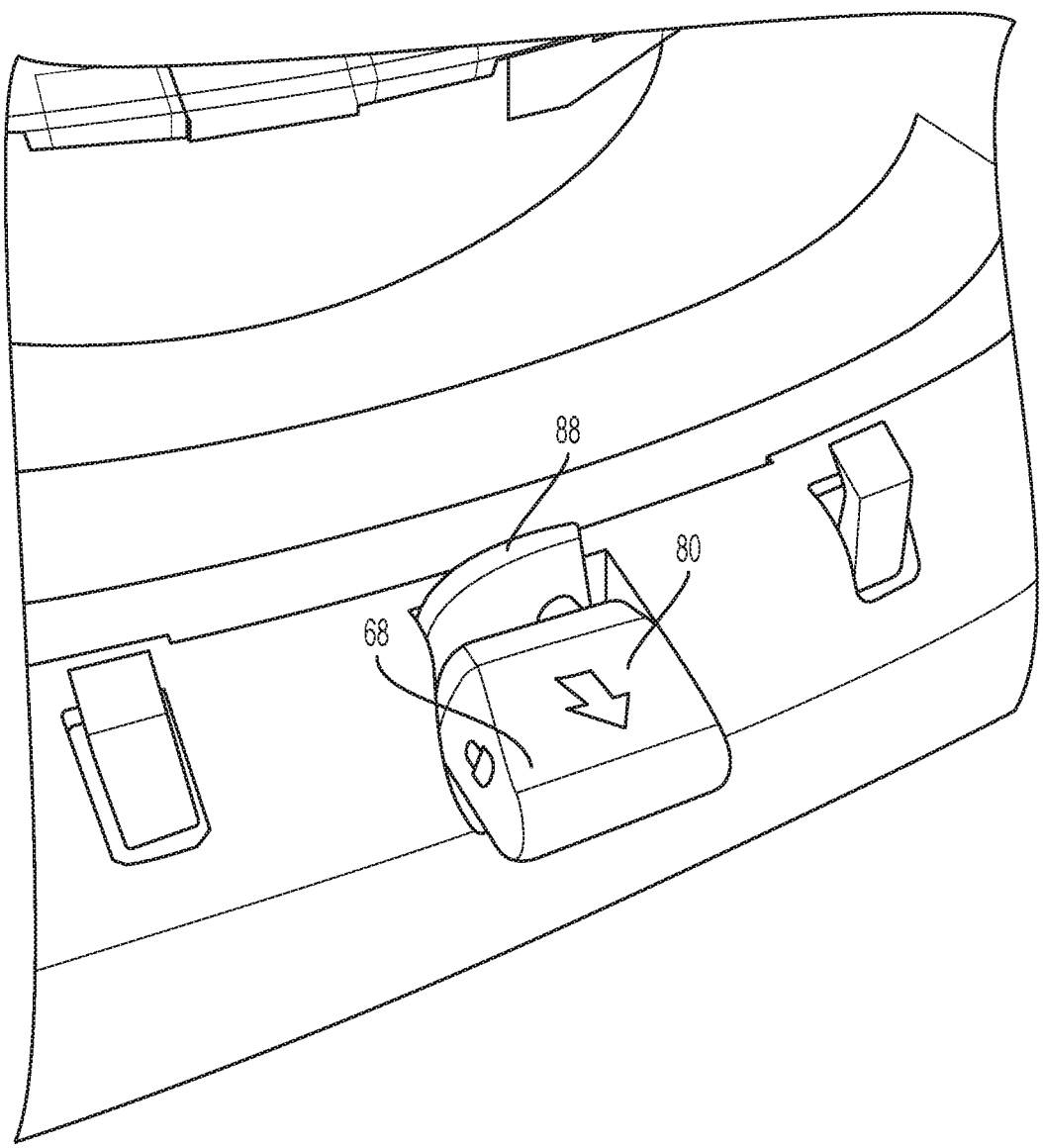
FIG. 6 is a perspective view of a portion of the latch mechanism showing the knob or manual lock of the electronic pet door of FIG. 1 in a third position.

FIG. 6 shows the knob 68 in a third position. In the third position, a radially extending third portion 80 of the knob 68, which has a radially low profile, allows the inward swinging or passage of the flap (14 at FIG. 3).

Figure 7:
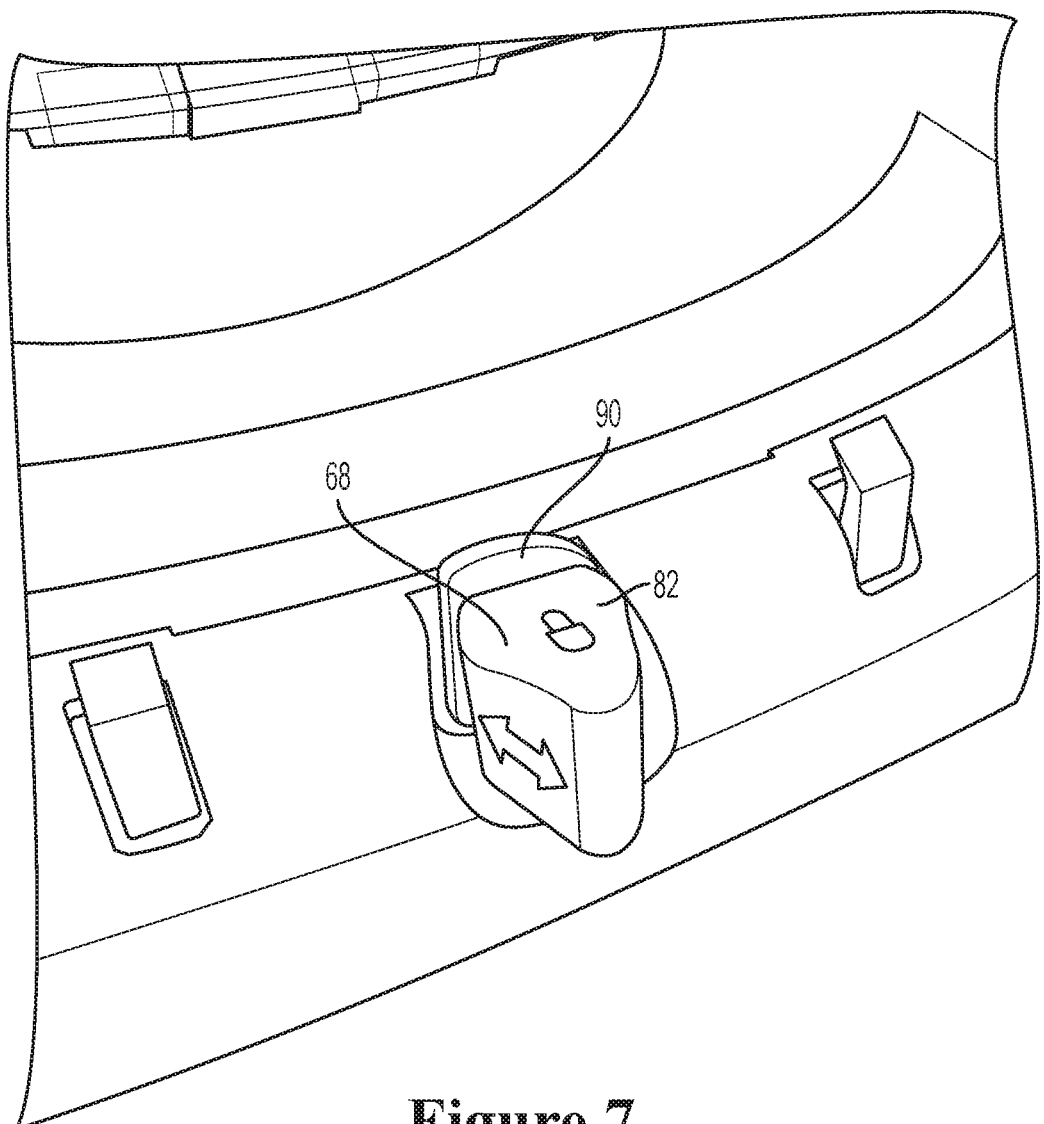
FIG. 7 is a perspective view of a portion of the latch mechanism showing the knob or manual lock of the electronic pet door of FIG. 1 in a fourth position.

FIG. 7 shows the knob 68 in a fourth position. When oriented in the fourth position, a radially extending fourth portion 82 of the knob 68, which has a radially high profile, prevents the inward swinging or passage of the flap (14 at FIG. 3).

Thus, according to FIGS. 4-7, when the knob 68 is rotated to a position wherein either the second or fourth portion 78 or 82 is positioned at the top, the flap (14 at FIG. 3) is prevented from swinging inwardly by the abutment of either portion 78 or 82 against the flap. With the knob 68 rotated to a position wherein either the first or third portion 76 or 80 is positioned at the top, the flap (14 at FIG. 3) passes unobstructed over the lower profile of these portions of the knob 68.

Also in FIG. 4, the knob stop wall 72 is asymmetrical with a radially extending first portion 84 aligned with the knob first portion 76 and having a radially low profile which allows the outward swinging or passage of the flap (14 at FIG. 3). The term "aligned with" as used herein is intended to mean a longitudinal alignment along the axis of rotation of the knob 68.

In FIG. 5, a radially extending second portion 86 of the knob stop wall 72 is aligned with the knob second portion 78 and has a radially low profile which allows the outward swinging or passage of the flap (14 at FIG. 3).

FIG. 6 shows a radially extending third portion 88 of the knob stop wall 72 aligned with the knob third portion 80 and having a radially high profile which prevents the outward swinging or passage of the flap (14 at FIG. 3).

In FIG. 7, a radially extending fourth portion 90 of the knob stop wall 72 is shown aligned with the knob fourth portion 82 and having a radially high profile which prevents the outward swinging or passage of the flap (14 at FIG. 3).

FIGS. 8 and 9 provide detailed perspective view of a portion of the latch mechanism 94.

As shown in FIG. 8, the electric motor 96 is coupled to an over center three bar linkage system 110. The linkage system 110 includes a first link 112 in the form of a pivot arm 114 coupled to the end of a drive shaft 116 of the electric motor 96. The pivot arm 114 has a radially offset pivot pin 118 which is passed through a pivot pin opening 120 extending through one end of a second link 122. FIG. 9 shows that the second link 122 also has a second pivot pin opening 124 which includes a first portion 126 and a second portion 128 which are interconnected to each other. A pivot pin 130 of a third link 132 is positioned within the second pivot pin opening 124 for movement between the first opening portion 126 and the second opening portion 128. The third link 132 is in the form of an elongated arm extending to an axle 136 rotatably coupled to the cover plate 40. The third link 132 also includes a pair of generally L-shaped arms 138 which each terminate with a foot, projection or stop (shown at 140 in FIG. 4). The stops 140 are positioned to reciprocally move through the frame opening (seen at 64 of FIGS. 3 and 4) between a first, extended, engaging position and a second, retracted, disengaging position. A coil spring 142 is mounted upon the axle 136 so as to spring bias the third link 132 towards its stops 140 first, extended, engaging position, shown in FIG. 9.

In the illustrated embodiments of the electronic pet door 10, to ensure that the flap 14 is at the closed position when a lateral force is not applied at the flap 14, the frame 12 is disposed such that gravity forces the flap 14 to the closed position when a lateral force is not applied. The placement of magnets 32 and 92 aid in positioning and maintaining the flap 14 in the generally vertical, closed position. It should be noted that a mechanical device other than magnets, such as a spring, can be used to force the flap 14 to the closed position in the absence of a lateral force without departing from the scope or spirit of the present invention.

With the knob 68 in the first position of FIG. 4, the knob's first portion 76 is positioned upwardly, and the low profile of the first portion 76 allows the flap 14 to swing inwardly (towards the interior of the house). Similarly, the low profile of the stop wall first portion 84 allows the flap 14 to swing outwardly (towards the exterior of the house). Thus, the knob 68 does not hamper or prevent any pivotal movement of the flap 14. However, as shown in FIG. 3, the latch mechanism 94 does prevent the inwardly movement of the flap 14 to prevent the entrance or access of unwanted animals, as the stops 140 of the third link 132 are springbiasly positioned in an upward position abutting the bottom portion 30 of the flap 14.

When a pet having the appropriate transmitter 106 approaches the pet door 10, the wireless signal from the transmitter 106 is received by the receiver 104 and the signal is sent to the microprocessor 102. The microprocessor 102 then energizes the motor 96 to rotate the drive shaft 116 and first link 112 in a counterclockwise direction with respect to the figures shown in the drawings. As shown in FIG. 8, the movement of the first link 112 moves the second link 122 downwardly, thereby pivoting the third link 132 downwardly against the biasing force of spring 142. The movement of the third link moves the stops 140 of the L-shaped arms 138 to their retracted positions. Once the stops 140 are in their retracted positions, the flap 14 is free to move inwardly to allow entrance of the pet.

Thus, when the knob 68 is in its first position of FIG. 4, the flap is able to pivot outwardly to allow the pet to egress or exit the house through the through-way 20. However, the latch mechanism prevents entry into the house through the inward pivoting of the flap 14 through the upward positioning of the stops 140 of the third link 132, unless a wireless signal is transmitted from transmitter 106 and received by receiver 104 to retract the stops 140.

With the knob 68 in the second position of FIG. 5, the knob's second portion 78 is positioned upwardly, and the high profile of the second portion 78 prevents the flap 14 from swinging inwardly (towards the interior of the house). However, the low profile of the stop wall second portion 86 allows the flap 14 to swing outwardly (towards the exterior of the house). Thus, the knob 68 prevents the inward movement of the flap 14 while allowing the outward movement of the flap 14. The latch mechanism 94 also prevents the inwardly movement of the flap 14 to prevent the entrance or ingress of unwanted animals, as the stops 140 of the third link 132 are spring-biasly positioned in an upward position abutting the bottom portion 30 of the flap 14.

Thus, when the knob 68 is in its second position of FIG. 5, the flap is able to pivot outwardly to allow the pet to egress or exit the house through the through-way 20. However, the knob second portion 78 prevents entry into the house through the inward pivoting of the flap 14 by engaging or abutting the bottom portion 30 of the flap 14.

With the knob 68 in the third position of FIG. 6, the knob's third portion 80 is positioned upwardly, and the low profile of the third portion 80 allows the flap 14 to swing inwardly (towards the interior of the house). However, the high profile of the stop wall third portion 88 abuts and therefore prevents the flap 14 from swinging outwardly (towards the exterior of the house). Thus, the knob handle portion 70 does not hamper or prevent the inward movement of the flap 14, but the stop wall 72 does prevent the outward movement of the flap. However, the latch mechanism 94 does prevent the inwardly movement of the flap 14 to prevent the entrance or access of unwanted animals, as the stops 140 of the third link 132 are spring biasly positioned in an upward position abutting the bottom portion 30 of the flap 14.

However, when a pet having the appropriate transmitter 106 approaches the pet door 10 from the outside or exterior, the wireless signal from the transmitter 106 is received by the receiver 104 and the signal is sent to the microprocessor 102. The microprocessor 102 then energizes the motor 96 to rotate the drive shaft 116 and first link 112 in a counter-clockwise direction with respect to the figures shown in the drawings. This movement of the first link 112 moves the second link 122 downwardly, thereby pivoting the third link 132 downwardly against the biasing force of spring 142. The movement of the third link moves the stops 140 of the L-shaped arms 138 to their retracted positions. Once the stops 140 are in their retracted positions, the flap 14 is free to move inwardly to allow entrance of the pet.

Thus, when the knob 68 is in its third position of FIG. 6, the flap is prevented from pivoting outwardly to prevent the pet from egressing or exiting the house. The latch mechanism prevents entry into the house through the inward pivoting of the flap 14 through the upward positioning of the stops 140 of the third link 132, unless a wireless signal is transmitted from transmitter 106 and received by receiver 104 to retract the stops 140 and allow entrance of the pet.

With the knob 68 in the fourth position of FIG. 7, the knob's fourth portion 82 is positioned upwardly, and the high profile of the fourth portion 82 prevents the flap 14 from swinging inwardly (towards the interior of the house). Similarly, the high profile of the stop wall fourth portion 90 prevents the flap 14 from swinging outwardly (towards the exterior of the house). Thus, the knob 68 prevents the inward movement of the flap 14 while the stop wall 72 prevents the outward movement of the flap 14. The latch mechanism 94 also prevents the inwardly movement of the flap 14 to prevent the entrance or ingress of unwanted animals, as the stops 140 of the third link 132 are spring-biasly positioned in an upward position abutting the bottom portion 30 of the flap 14.

Thus, when the knob 68 is in its fourth position, the flap 14 assumes a locked position and is unable to pivot in either direction and therefore prevents passage of an animal through the through-way 20.

When the stops 140 of the third link 132 are in their upward, extended position through the biasing force of the spring 142, the stops 140 may be placed in a manual mode via the on/off/programming switch 62 to allow the inward pivoting of the flap 14, provided that the knob 68 is in its first or third position. This allows for the manual operation of the flap 14 in case there is a problem with the wireless signal, the loss of a transmitter 106, a low battery voltage, or other similar problem. The manual actuation or depression of the stops 140 moves the third link pivot pin 130 to move from the first portion 126 to the second portion 128 of the second pivot pin opening 124. Thus, the second link 122 is not required to move. The spring biasing force of spring 142 automatically returns the third link pivot pin 130 to the first portion 126, and thus the stops 140 to their extended position.

An electronic pet door 10 of an embodiment is comprising a frame 12 and a flap 14 pivotally coupled to the frame for inward and outward pivotal movement. The flap further comprising a top portion 26 and a bottom portion 30 opposite the top portion and a knob 68 rotatably coupled to the frame. The knob further comprises a first portion 76 with a select height to allow the inward pivotal movement of the flap bottom portion past the knob, a second portion 78 with a select height to abut the flap bottom portion to prevent the inward pivotal movement of the flap bottom portion past the knob, a third portion 80 with a select height to allow the inward pivotal movement of the flap bottom portion past the knob, and a fourth portion 82 with a select height to abut the flap bottom portion to prevent the inward pivotal movement of the flap bottom portion past the knob. The knob also has a stop wall 72 having a stop wall first portion 84 aligned with the knob first portion and having a select height to allow the outward pivotal movement of the flap bottom portion past the stop wall, a stop wall second portion 86 aligned with the knob second portion and having a select height to allow the outward pivotal movement of the flap bottom portion past the stop wall, a stop wall third portion 88 aligned with the knob third portion and having a select height to prevent the outward pivotal movement of the flap bottom portion past the stop wall, and a stop wall fourth portion 90 aligned with the knob fourth portion and having a select height to prevent the outward pivotal movement of the flap bottom portion past the stop wall.

The electronic pet door also comprises an automatic latching device 94.

The electronic pet door also comprises the automatic latching device 94 having a linkage 110 coupled to an electric motor.

The electronic pet door also comprises the linkage 110 comprising a first link 112 in the form of a pivot arm coupled to the electric motor 96, a second link 122 pivotally coupled to the first link 112 opposite the electric motor 96, and a third link 132 pivotally coupled to the second link 122 and opposite the first link 112, wherein the third link 132 further comprises a stop 140 extending through the frame between a first position engaging the bottom portion of the flap and a second position disengaged from the bottom portion of the flap.

The electronic pet door also comprises a spring 142 configured to bias the third link 132 towards the first position.

The electronic pet door also comprises the automatic latching device including a wireless transmitter 106 and a wireless receiver 104 configured to enable wireless actuation of the latching device.

The electronic pet door also comprising the wireless transmitter 106 is an internally mountable wireless transmitter.

An electronic pet door 10 of an embodiment is comprising a frame 12, a flap 14 pivotally coupled to the frame with the flap further comprising a top portion 26 and a bottom portion 30 opposite the top portion. The electronic pet door 10 also has an automatic latching device 94 having linkage 110 coupled to an electric motor, wherein the linkage further comprises a first link 112 in the form of a pivot arm coupled to the electric motor, a second link 122 pivotally coupled to the first link opposite the electric motor, and a third link 132 pivotally coupled to the second link opposite the first link. The third link further comprises a stop 140 extending through the frame between a first position engaging the bottom portion of the flap and a second position disengaged from the bottom portion of the flap, and a spring 142 configured to bias the third link 132 towards the first position.

An electronic pet door 10 of an embodiment is comprising electronic pet door comprising a frame 12, a flap 14 pivotally coupled to the frame for inward and outward pivotal movement, and a rotating member 68 rotatably coupled to the frame. The rotating member 68 includes an interior portion configured to selectively allow or prevent the inward pivotal movement of the flap 14 depending upon the rotatable position of the interior portion 72, and an exterior portion configured to selectively allow or prevent the outward pivotal movement of the flap depending upon the rotatable position of the exterior portion, wherein the rotating member interior portion 72 being spaced from the rotating member exterior portion to define a space 74 therebetween configured to receive a portion of the flap 14.

The electronic pet door also comprises the rotating member interior portion 72 having a first portion 76 with a select height to allow the inward pivotal movement of the flap bottom portion past the interior portion, a second portion 78 with a select height to abut the flap bottom portion to prevent the inward pivotal movement of the flap bottom portion past the interior portion, a third portion 80 with a select height to allow the inward pivotal movement of the flap bottom portion past the interior portion, and a fourth portion 82 with a select height to abut the flap bottom portion to prevent the inward pivotal movement of the flap bottom portion past the interior portion.

The electronic pet door also comprises an exterior portion 72 having an exterior portion first portion 84 aligned with the interior portion first portion 76 and having a select height to allow the outward pivotal movement of the flap past the exterior portion, an exterior portion second portion 86 aligned with the interior member second portion 78 and having a select height to allow the outward pivotal movement of the flap past the exterior portion, an exterior portion third portion 88 aligned with the interior portion third portion 80 and having a select height to prevent the outward pivotal movement of the flap past the exterior portion, and an exterior portion fourth portion 90 aligned with the interior portion fourth portion 82 and having a select height to prevent the outward pivotal movement of the flap past the exterior portion.

An electronic pet door of an embodiment is comprising a frame, a flap pivotally coupled to the frame for inward and outward pivotal movement, and a rotating member rotatably coupled to the frame. The rotating member is configured to have a first position which allows both inward and outward pivotal movement of the flap, a second position which prevents inward pivotal movement of the flap but allows outward pivotal movement of the flap, a third position which allows inward pivotal movement of the flap but prevents outward pivotal movement of the flap, and a fourth position which prevents both inward and outward pivotal movement of the flap.

It will be appreciated that the inventions are susceptible to modification, variation, and change without departing from the spirit thereof.

We claim:

1. A pet door comprising:
    a frame;
    a flap pivotally coupled to the frame for inward and outward pivotal movement, the flap further comprising a top portion and a bottom portion opposite the top portion;
    a knob rotatably coupled to the frame; wherein the knob further comprises:
        a first portion with a select height to allow the inward pivotal movement of the flap bottom portion past the knob;
        a second portion with a select height to abut the flap bottom portion to prevent the inward pivotal movement of the flap bottom portion past the knob;
        a third portion with a select height to allow the inward pivotal movement of the flap bottom portion past the knob; and
        a fourth portion with a select height to abut the flap bottom portion to prevent the inward pivotal movement of the flap bottom portion past the knob; and
    a stop wall, wherein the stop wall further comprises:
        a stop wall first portion aligned with the knob first portion and having a select height to allow the outward pivotal movement of the flap bottom portion past the stop wall;
        a stop wall second portion aligned with the knob second portion and having a select height to allow the outward pivotal movement of the flap bottom portion past the stop wall;
        a stop wall third portion aligned with the knob third portion and having a select height to prevent the outward pivotal movement of the flap bottom portion past the stop wall; and
        a stop wall fourth portion aligned with the knob fourth portion and having a select height to prevent the outward pivotal movement of the flap bottom portion past the stop wall.

2. The pet door of claim 1, further comprising an automatic latching device.

3. The pet door of claim 2, wherein the automatic latching device comprises a linkage coupled to an electric motor.

4. The pet door of claim 3, wherein the linkage comprises:
    a first link in the form of a pivot arm coupled to the electric motor;
    a second link pivotally coupled to the first link opposite the electric motor; and a third link pivotally coupled to the second link and opposite the first link; wherein the third link further comprises a stop extending through the frame between a first position engaging the bottom portion of the flap and a second position disengaged from the bottom portion of the flap.

5. The pet door of claim 4 further comprising a spring configured to bias the third link towards the first position.

6. The pet door of claim 2 wherein the automatic latching device includes a wireless transmitter and a wireless receiver configured to enable wireless actuation of the latching device.

7. The pet door of claim 6 wherein the wireless transmitter is an internally mountable wireless transmitter.

8. A pet door:
a frame;
a flap pivotally coupled to the frame, the flap further comprising a top portion and a bottom portion opposite the top portion;
an automatic latching device having linkage coupled to an electric motor, wherein
the linkage further comprises:
a first link in the form of a pivot arm coupled to the electric motor;
a second link pivotally coupled to the first link opposite the electric motor; and
a third link pivotally coupled to the second link opposite the first link; wherein
the third link further comprises:
a stop extending through the frame between a first position engaging the bottom portion of the flap and a second position disengaged from the bottom portion of the flap; and
a spring configured to bias the third link towards the first position.

9. The pet door of claim 8 wherein the automatic latching device also includes a wireless transmitter and a wireless receiver configured to enable wireless actuation of the latching device.

10. The pet door of claim 9 wherein the wireless transmitter is an internally mountable wireless transmitter.

11. The pet door of claim 8 further comprising:
a knob rotatably coupled to the frame, wherein the knob further comprises:
a first portion with a select height to allow the pivotal movement of the flap bottom portion past the knob;
a second portion with a select height to abut the flap bottom portion to prevent the pivotal movement of the flap bottom portion past the knob;
a third portion with a select height to allow the pivotal movement of the flap bottom portion past the knob;
a fourth portion with a select height to abut the flap bottom portion to prevent the pivotal movement of the flap bottom portion past the knob; and
a stop wall, wherein the stop wall further comprises:
a stop wall first portion aligned with the knob first portion and having a select height to allow the pivotal movement of the flap bottom portion past the stop wall;
a stop wall second portion aligned with the knob second portion and having a select height to allow the pivotal movement of the flap bottom portion past the stop wall;
a stop wall third portion aligned with the knob third portion and having a select height to prevent the pivotal movement of the flap bottom portion past the stop wall; and a stop wall fourth portion aligned with the knob fourth portion and having a select height to prevent the pivotal movement of the flap bottom portion past the stop wall.

12. A pet door comprising:
a frame;
a flap pivotally coupled to the frame for inward and outward pivotal movement;
a rotating member rotatably coupled to the frame; wherein the rotating member includes an interior portion configured to selectively allow or prevent the inward pivotal movement of the flap depending upon the rotatable position of the interior portion, and an exterior portion configured to selectively allow or prevent the outward pivotal movement of the flap depending upon the rotatable position of the exterior portion, the rotating member interior portion being spaced from the rotating member exterior portion to define a space therebetween configured to receive a portion of the flap.

13. The pet door of claim 12 wherein the rotating member interior portion includes:
first portion with a select height to allow the inward pivotal movement of the flap bottom portion past the interior portion;
second portion with a select height to abut the flap bottom portion to prevent the inward pivotal movement of the flap bottom portion past the interior portion;
third portion with a select height to allow the inward pivotal movement of the flap bottom portion past the interior portion; and
fourth portion with a select height to abut the flap bottom portion to prevent the inward pivotal movement of the flap bottom portion past the interior portion; and
a stop wall, wherein the stop wall further comprises.

14. The pet door of claim 13 wherein the rotating member exterior portion includes:
an exterior portion first portion aligned with the interior portion first portion and having a select height to allow the outward pivotal movement of the flap past the exterior portion;
an exterior portion second portion aligned with the interior member second portion and having a select height to allow the outward pivotal movement of the flap past the exterior portion;
an exterior portion third portion aligned with the interior portion third portion and having a select height to prevent the outward pivotal movement of the flap past the exterior portion; and
an exterior portion fourth portion aligned with the interior portion fourth portion and having a select height to prevent the outward pivotal movement of the flap past the exterior portion.

15. The pet door of claim 12, further comprising an automatic latching device.

16. The pet door of claim 15, wherein the automatic latching device comprises a linkage coupled to an electric motor.

17. The pet door of claim 16, wherein the linkage comprises:
a first link in the form of a pivot arm coupled to the electric motor;
a second link pivotally coupled to the first link opposite the electric motor; and
a third link pivotally coupled to the second link and opposite the first link; wherein the third link further comprises a stop extending through the frame between a first position engaging the flap and a second position disengaged from the flap.

18. The pet door of claim 17 further comprising a spring configured to bias the third link towards the first position.

19. The pet door of claim 15 wherein the automatic latching device includes a wireless transmitter and a wireless receiver configured to enable wireless actuation of the latching device.

20. The pet door of claim 19 wherein the wireless transmitter is an internally mountable wireless transmitter.

21. An pet door comprising:
a frame;
a flap pivotally coupled to the frame for inward and outward pivotal movement, and
a rotating member rotatably coupled to the frame; wherein the rotating member is configured to have a first position which allows both inward and outward pivotal movement of the flap, a second position which prevents inward pivotal movement of the flap but allows outward pivotal movement of the flap, a third position which allows inward pivotal movement of the flap but prevents outward pivotal movement of the flap, and a fourth position which prevents both inward and outward pivotal movement of the flap.

22. The pet door of claim 21, further comprising an automatic latching device.

23. The pet door of claim 22, wherein the automatic latching device comprises a linkage coupled to an electric motor.

24. The pet door of claim 23, wherein the linkage comprises:
a first link in the form of a pivot arm coupled to the electric motor;
a second link pivotally coupled to the first link opposite the electric motor; and
a third link pivotally coupled to the second link and opposite the first link; wherein
the third link further comprises a stop extending through the frame between a first position engaging the flap and a second position disengaged from the flap.

25. The pet door of claim 24 further comprising a spring configured to bias the third link towards the first position.

26. The pet door of claim 22 wherein the automatic latching device includes a wireless transmitter and a wireless receiver configured to enable wireless actuation of the latching device.

27. The pet door of claim 26 wherein the wireless transmitter is an internally mountable wireless transmitter.

\* \* \* \* \*